US008960228B2

(12) United States Patent
Hervieux et al.

(10) Patent No.: US 8,960,228 B2
(45) Date of Patent: Feb. 24, 2015

(54) ROTARY CONTROL VALVE

(75) Inventors: Arnauld Roger Edmond Hervieux, Versailles (FR); Laurent Patrice Donadille, Levis Saint Nom (FR)

(73) Assignee: Goodrich Actuation Systems SAS (FR)

( * ) Notice: Subject to any disclaimer, the term of this patent is extended or adjusted under 35 U.S.C. 154(b) by 265 days.

(21) Appl. No.: 13/617,199

(22) Filed: Sep. 14, 2012

(65) Prior Publication Data

US 2013/0075642 A1 Mar. 28, 2013

(30) Foreign Application Priority Data

Sep. 28, 2011 (GB) .................................. 1116679.0

(51) Int. Cl.

*B62D 5/083* (2006.01)
*F15B 13/04* (2006.01)
*F15B 20/00* (2006.01)

(52) U.S. Cl.

CPC ........... *F15B 13/0406* (2013.01); *F15B 20/008* (2013.01)
USPC .................. 137/625.23; 137/625.22; 91/437; 91/509

(58) Field of Classification Search

USPC ............. 137/625.21, 625.22, 625.23, 625.24; 91/437, 509
See application file for complete search history.

(56) References Cited

U.S. PATENT DOCUMENTS

| | | | | |
|---|---|---|---|---|
| 1,084,740 | A * | 1/1914 | Holzwarth | 137/625.23 |
| 2,675,679 | A * | 4/1954 | Parker | 91/509 |
| RE25,126 | E * | 2/1962 | Charlson | 91/467 |
| 4,040,338 | A * | 8/1977 | Wilson et al. | 92/106 |
| 4,290,452 | A | 9/1981 | Takahashi et al. | |
| 4,335,745 | A * | 6/1982 | Bouveret et al. | 137/554 |
| 4,858,650 | A | 8/1989 | Devaud et al. | |
| 2010/0187451 | A1 | 7/2010 | Vinski et al. | |

OTHER PUBLICATIONS

GB Search Report dated Dec. 5, 2011.
European Search Report for Application No. 12184132.4-1751/2574797 Mailed on Sep. 13, 2013 5 pages.

* cited by examiner

*Primary Examiner* — Stephen M Hepperle
*Assistant Examiner* — Seth W Mackay-Smith
(74) *Attorney, Agent, or Firm* — Cantor Colburn LLP

(57) ABSTRACT

A control valve comprises a first spool 22, a second spool 24 encircling at least part of the first spool 22 and angularly moveable relative thereto, and a sleeve 32 encircling at least part of the second spool 24, the second spool 24 being angularly moveable relative to the sleeve 32, the first and second spools 22, 24 having first and second series of ports 28, 30 registrable with one another, depending upon the relative angular positions of the first and second spools 22, 24, to control communication between at least a pressure line 16, a return line 18 and a control line 50 provided in or connected to the sleeve 32, the second spool 24 and the sleeve 32 having third and fourth series of ports 66, 68, axially spaced from the first and second series of ports 28, 30 and registrable with one another, depending upon the relative angular positions of the second spool 24 and the sleeve 32, to control communication between at least the control line 50 and the return line 18, and latch means 56 operable to resist movement of the second spool 24 relative to the sleeve 32.

8 Claims, 4 Drawing Sheets

ROTARY CONTROL VALVE

This invention relates to a rotary control valve, for example to a rotary control valve suitable for use in controlling the supply of fluid under pressure to an actuator and thereby control the operation of the actuator.

Where the function of an actuator is critical to safety, it is well known to incorporate redundancy into the system in which the actuator is used so as to accommodate failures within the actuator or associated control system without preventing operation of the system.

One form of valve suitable for use in controlling the operation of such an actuator takes the form of a linear control valve. In order to permit the provision of the required degree of redundancy in the event of the linear control valve becoming jammed, a separate by-pass valve arrangement is provided to permit the valve outlets to be connected to one another and so permit the associated actuator to be moved by an external device or under the control of another valve to a desired position. An alternative valve suitable for use in this type of application is a rotary valve comprising a pair of spools arranged concentrically within a sleeve. In normal use, angular movement of one of the spools relative to the other spool is used to control the delivery of fluid to the actuator. In the event that the spools become jammed so that such relative movement is no longer possible, adjustment of the angular position of the second spool relative to the sleeve can be used to achieve the desired level of control to permit continued operation.

Control valves of the types described hereinbefore are typically of relatively large form and so may be difficult to accommodate in applications in which space is limited, such as in many aerospace applications. Furthermore, the control valves are typically relatively complex and undesirably heavy.

It is an object of the invention to provide a control valve in which at least some of the disadvantages associated with known control valves are overcome or are of reduced effect.

According to the present invention there is provided a control valve comprising a first spool, a second spool encircling at least part of the first spool and angularly moveable relative thereto, and a sleeve encircling at least part of the second spool, the second spool being angularly moveable relative to the sleeve, the first and second spools having first and second series of ports registrable with one another, depending upon the relative angular positions of the first and second spools, to control communication between at least a pressure line, a return line and a control line provided in or connected to the sleeve, the second spool and the sleeve having third and fourth series of ports, axially spaced from the first and second series of ports and registrable with one another, depending upon the relative angular positions of the second spool and the sleeve, to control communication between at least the control line and the return line, and latch means operable to resist movement of the second spool relative to the sleeve.

In such an arrangement, in normal use, the second spool is held against angular movement relative to the sleeve by the latch means and angular movement of the first spool relative to the second spool controls communication between at least some of the ports of the first and second series of ports, and thus the pressure line, the return line and the control line. By appropriate control over the position of the first spool relative to the second spool, an actuator connected to the control line can be controlled. In the event of the first and second spools becoming jammed to one another, angular movement of the first spool can also result in angular movement of the second spool by virtue of these components being jammed to one another, provided the applied torque is sufficient to overcome the action of the latch means. The movement of the second spool allows communication to be established between the ports of the third and fourth series of ports so as to establish communication between the control line and the return line. The establishment of such communication provides a by-pass arrangement. The incorporation of a by-pass arrangement into a rotary control valve in this manner allows the required provision of redundancy without excessively increasing the size and weight of the control valve and in a relatively simple and convenient form.

Preferably, the latch means comprises a formation provided on the second spool, the formation including a recess, a latch element cooperating with the formation and being urged into the recess to resist angular movement of the second spool. Conveniently the latch element is spring biased towards the recess. The recess is preferably of symmetrical, ramped form.

Preferably first and second control tines are provided, the establishment of communication between the ports of the first and second series of ports providing communication between one of the control lines and the pressure line and providing communication between the other of the control lines and the return line. Preferably the establishment of communication between the ports of the third and fourth series of ports connects both the first control line and the second control line to the return line.

Conveniently a pair of rotary control valves of this type are used in combination in controlling the operation of the actuator. In the event of a jam within one of the valves, that valve can be moved to its by-pass position allowing the actuator to continue to operate under the control of the other of the control valves. It will be appreciated that although the operation of the actuator may be degraded, it can continue to function, the control valve in the by-pass position acting as a damper which damps actuator movement but does not prevent it.

The control valves are preferably driven synchronously, the jammed control valve occupying its by-pass position at any time that the still functioning valve establishes communication between the control line(s) and the pressure line and/or return line.

The invention will further be described, by way of example, with reference to the accompanying drawings, in which.

Figure 1:
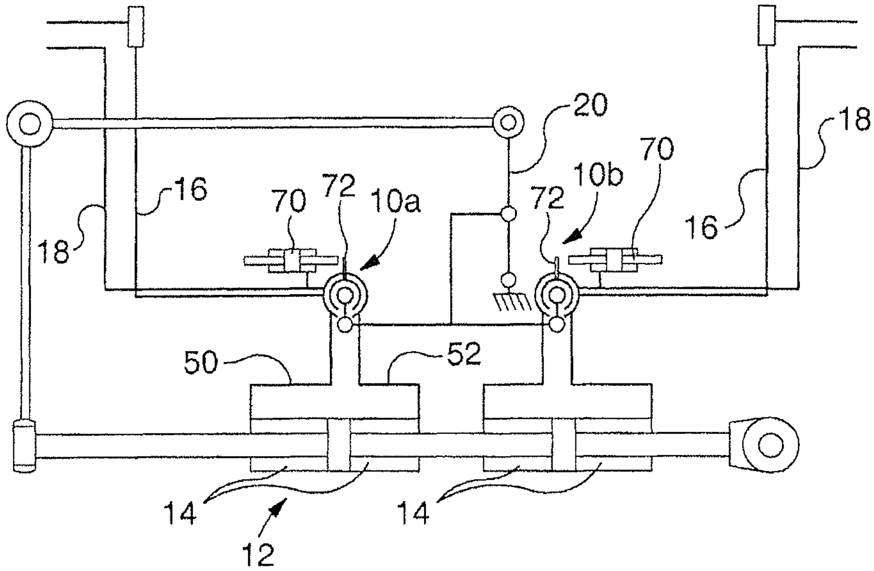
FIG. 1 is a diagram illustrating an actuator and rotary control valve arrangement controlling the operation thereof.
Figure 3:
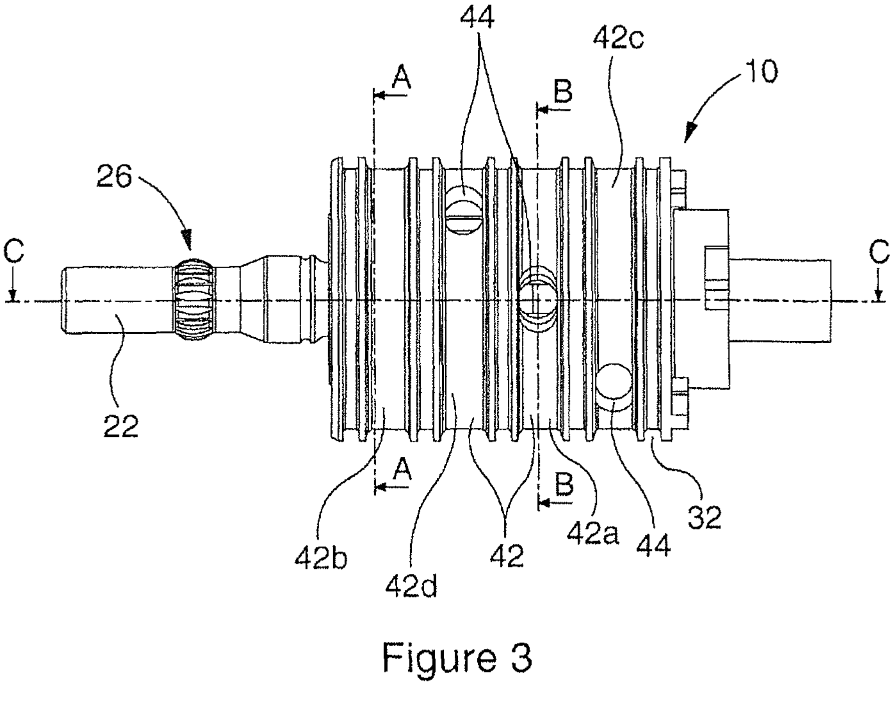
FIG. 3 is a side view of part of the rotary control valve shown in FIG. 2.

Referring to the accompanying drawings, a rotary control valve 10 is illustrated for use in controlling the operation of a hydraulic or so-called fuel-draulic actuator 12. As shown in FIG. 1, a pair of control valves 10*a*, 10*b* are conveniently associated with the actuator 12, each control valve 10*a*, 10*b* being operable to control the connection of respective pairs of control chambers 14 to a pressure line 16 and to a return line 18. A common drive linkage arrangement 20 is provided to control the operation of the control valves 10*a*, 10*b* such that they operate in a synchronised fashion. As described below, in the event of a jam occurring in one of the control valves 10*a*, 10*b*, that control valve is able to occupy a by-pass position when adjustment of the actuator position is required, thereby permitting continued use of the actuator 12, albeit in a degraded manner due to the damping effect provided by the jammed control valve.

The control valves 10*a*, 10*b* are substantially identical to one another and so only one of the control valves will be described herein in further detail.

As shown in FIGS. 2 to 9, the control valve 10 comprises a first, inner spool 22 which extends through a bore formed in a second, outer spool 24 such that the second spool 24 encircles the first spool 22. The first spool 22 includes a region of diameter substantially equal to the diameter of the adjacent part of the bore of the second spool 24 such as to form a reasonably good seal therewith. The first spool 22 is provided, at a part thereof which projects from the second spool 24, with gear teeth or spline formations 26 to allow the associated drive arrangement 20 to drive the first spool 22 for angular movement.

Figure 5:
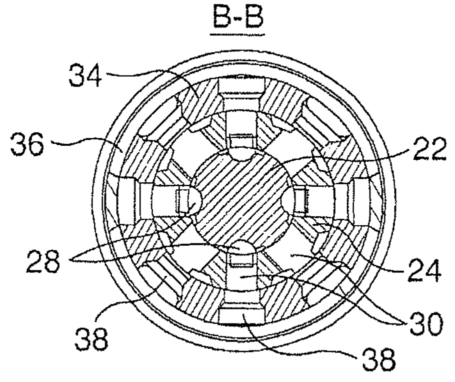

The first spool 22 is provided, on its periphery, with a first series of ports 28 in the form of recesses. The ports 28 are axially aligned with a second series of ports 30 formed in the second spool 24. Unlike the first series of ports 28, the ports 30 take the form of openings extending through the second spool 24. As best shown in FIG. 5, four equiangularly spaced ports 28 are provided on the first spool 22, and eight equiangularly spaced ports 30 are provided on the second spool 24. The design and positioning of the ports 28, 30 is such that when the first spool 22 occupies a closed position, each port 28 thereof communicates with just one of the ports 30. Angular movement of the first spool 22 in either direction away from the closed position results in each port 28 registering with a pair of adjacent ones of the ports 30, establishing communication therebetween.

The second spool 24 extends through a central passage formed in a sleeve 32. The sleeve 32 is, for convenience, of two part construction, comprising an inner sleeve 34 and an outer sleeve 36. The inner and outer sleeves 34, 36 are rigidly secured to one another and are not permitted to move relative to one another, in use.

The inner sleeve 34 defines a series of ports 38 which are axially aligned with the ports 28, 30 and, in the position illustrated, are angularly aligned with the ports 30. It will be appreciated, therefore, that when the second spool 24 occupies the angular position illustrated, angular movement of the first spool 22 controls communication between adjacent ones of the ports 38 provided in the inner sleeve 34.

Figure 9A:
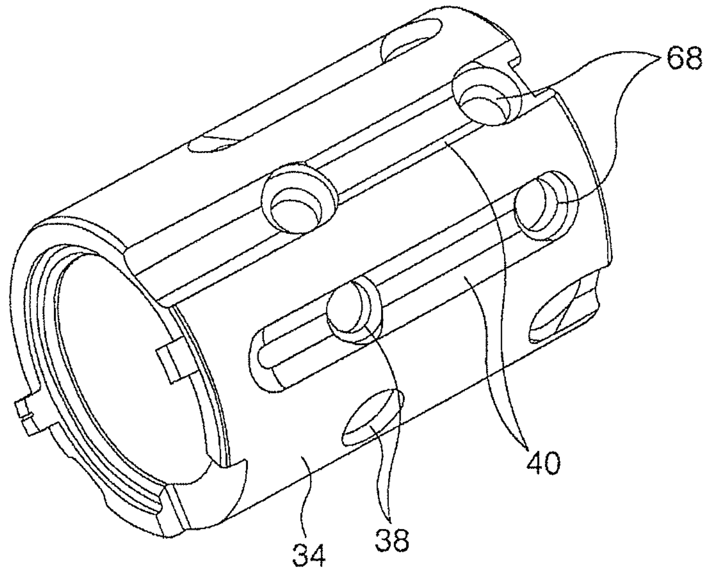
FIGS. 9*a* and 9*b* are perspective views of parts of the sleeve of the rotary control valve.
Figure 9B:
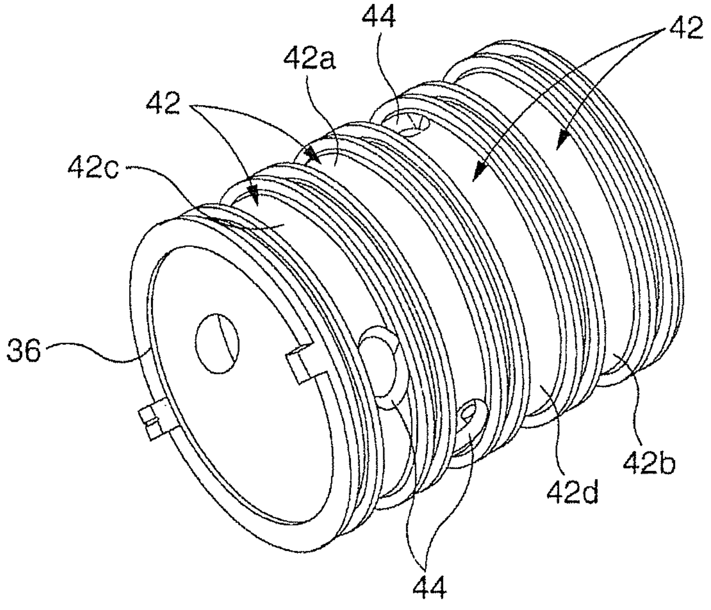

As shown in FIG. 9*a*, the ports 38 extend through the inner sleeve 34. The outer periphery of the inner sleeve 34 is provided with a series of axially extending channels 40 communicating with respective ones of the ports 38. The outer sleeve 36, as shown in FIG. 9*b*, is formed on its outer surface with a series of annular recesses or chambers 42, and each chamber 42*a*, 42*b*, 42*c*, 42*d* communicates, via respective passages 44 formed in the outer sleeve 36 (two passages 44 in each chamber 42*a*, 42*b*, 42*c*, 42*d*), with a pair of the channels 40, and hence with a pair of the ports 38. In use, the sleeve 32 is located within a housing (not shown) provided with connections such that a first one of the chambers 42*a* is connected to the high pressure line 16, a second one of the chambers 42*b* is connected to the return line 18, a third one of the chambers 42*c* is connected to a first control line 50 connected to one of the control chambers 14 of the actuator 12, and a fourth one of the chambers 42*d* is connected to a second control line 52 connected to another of the control chambers 14.

It will be appreciated that with the spools 22, 24 and sleeve 32 in the orientation shown, no high pressure or return connections to the control chambers 14 are made. The actuator 12 is thus held against movement. From this position, angular movement of the first spool 22 in one direction establishes communication between the first chamber 42*a* and the third chamber 42*c*, applying high pressure to the first control line 50 and associated control chamber 14, and establishes communication between the second chamber 42*b* and the fourth chamber 42*d*, connecting the second control line 52 and the associated control chamber 14 to the return line 18. Movement of the actuator 12 will thus take place, such movement continuing until either the actuator 12 reaches the end of its travel or the control valve is moved to another position. It will be appreciated that movement of the first spool 22 in the opposite direction reverses the connections and so drives the actuator 12 in the opposite direction.

Figure 2:
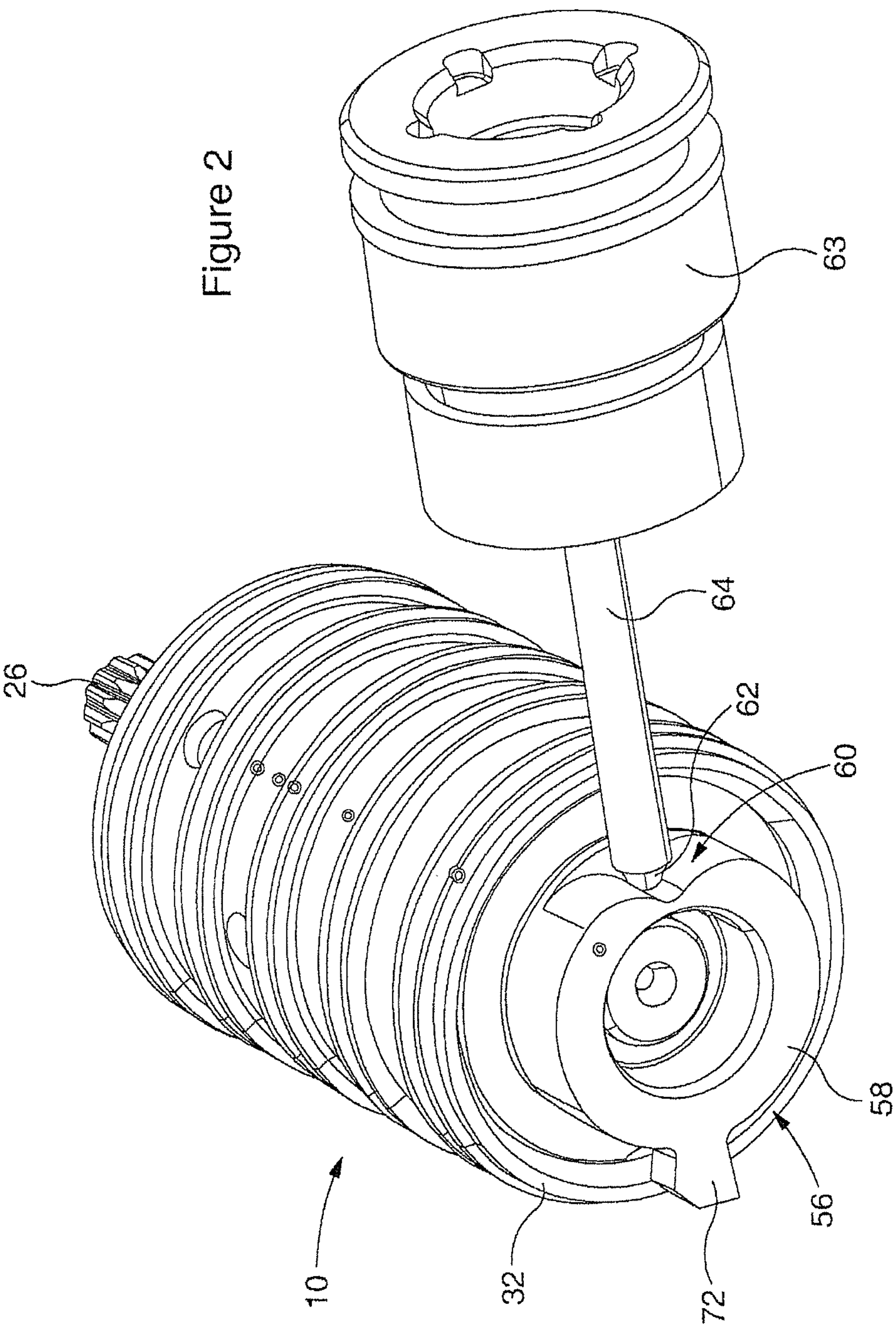
FIG. 2 is a perspective view illustrating part of a rotary control valve used in the arrangement of FIG. 1.

During this mode of operation it is important to ensure that the second spool 24 does not move relative to the sleeve 32 in order to ensure that the communication between the ports 30 of the second spool 24 and the ports 38 of the sleeve 32 is maintained. In order to resist angular movement of the second spool 24 a latch means 56 is provided. The latch means 56 comprises a flange 58 formed on the second spool 24 and provided with a recess 60. As shown in FIG. 2, a latch member 62 in the form of a ball element carried by an end of a piston rod 64 is seated in the recess 60. The piston rod 64 is biased by a spring 63 to urge the latch member 62 into the recess 60. Provided the torque applied to the second spool 24, in use, is relatively low, the spring loading applied to the latch member 62, in combination with the shape of the side walls of the recess 60, is sufficient to hold the second spool 24 against angular movement.

In use, if the first and second spools 22, 24 become jammed to one another, it will be appreciated that the continued application of torque to the first spool 22 to drive it to a desired angular position will result in a significant torque loading being applied to the second spool 24. If this applied torque is sufficiently large, angular movement of the second spool 24 may commence driving the second spool 24 towards a by-pass position, the latch member 62 riding up the ramped side walls of the recess 60 against the action of the applied spring loading to achieve such movement.

Figure 4:
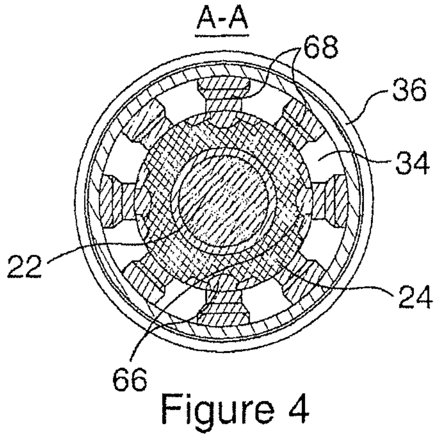
FIGS. 4, 5 and 6 are sectional views along the lines A-A, B-B and C-C, respectively, in FIG. 3.
Figure 6:
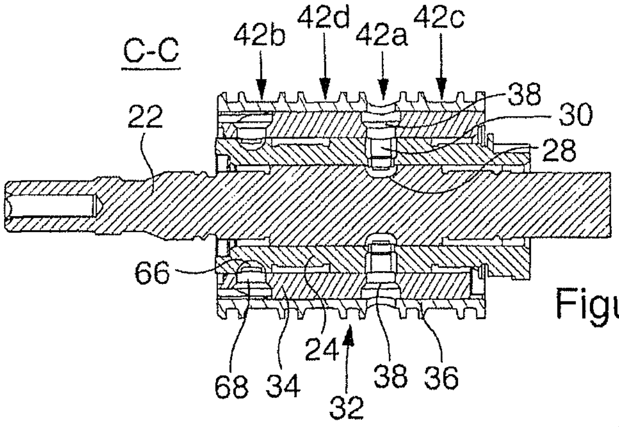
Figure 7:
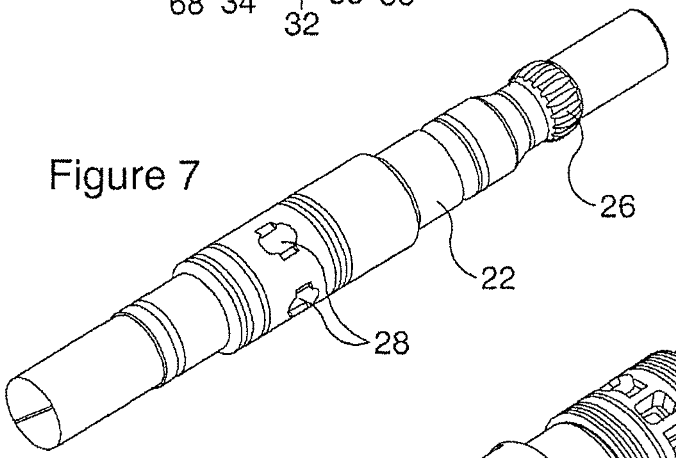
FIGS. 7 and 8 are perspective views of the first and second spools of the rotary control valve.
Figure 8:
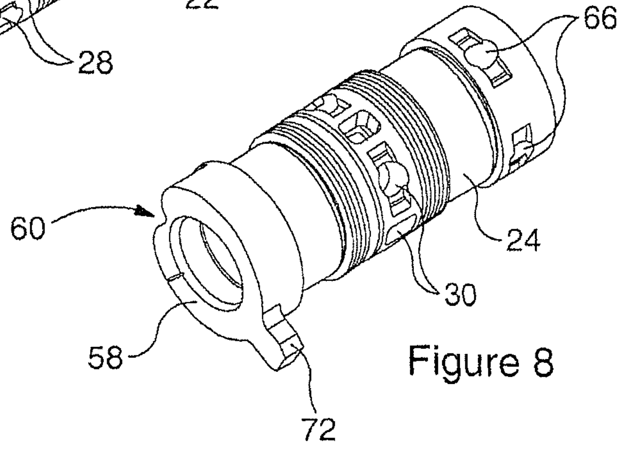

As shown in FIGS. 6 and 8, at an axial position spaced from the first and second series of ports 28, 30, the second spool 24 is provided with a third series of ports 66 in the form of recesses provided in the periphery thereof. As shown in FIG. 4, four such ports 66 are provided. The ports 66 are axially aligned with a fourth series of ports 68 provided in the sleeve 32. The ports 68 are equiangularly spaced, and eight such ports are provided. Alternate ones of the ports 68 communicate with the channels 40 connected to the chamber 42*b*, and so are connected to the return line 18. Two opposing ones of the ports 68 communicate with the channels 40 connected to the chamber 42*c* and so are connected to the first control line 50. The remaining two ports 68 are connected to the channels 40 communicating with the chamber 42*d* and so are connected to the second control line 52.

When the second spool 24 is in the angular position illustrated, in which it is latched by the latch means 56, it will be appreciated that each port 66 of the third series communicates with just one of the ports 68 of the fourth series. None of the ports 68 communicates via the ports 66 with another of the ports 68. During normal operation of the control valve 10, therefore, these ports 66, 68 and this part of the control valve 10 play no part in the operation of the control valve 10 and so have no effect upon the control or operation of the actuator 12.

However, in the event that the first and second spools 22, 24 become jammed and so the second spool 24 is driven for movement, as outlined hereinbefore, after movement of the second spool 24 beyond a predetermined distance, each port 66 will move into communication with two adjacent ones of the ports 68. Consequently, communication will be established between both of the control lines 50, 52 and the return line 18. Depending upon the angular position of the first spool 22 relative to the second spool 24, one or other of the control lines 50, 52 may also be connected to the high pressure line 16, and so some parasitic losses of fuel from the high pressure line 16 to the return line 18 may take place.

It will be appreciated that by connecting both of the control lines 50, 52 to the return line 18, movement of the actuator 12 under the control of, for example, the control valve 10*b* in the event of a jam within the control valve 10*a*, may take place without the formation of a hydraulic lock that would otherwise prevent such operation. The failed control valve will damp such movement, but will not prevent it from taking place. Clearly, such damped operation may result in the actuator operating in a degraded condition. However, since the actuator can continue to function, safety is maintained.

As shown in FIG. 1, conveniently a test piston 70 is associated with each control valve 10 and is operable to engage a projection 72 formed on the second spool 24 to force the second spool 24 out of its normal operating position and thereby mimic the occurrence of a jam. By appropriate control over the pistons 70, testing of the system and its ability to drive the actuator 12 in the event of a failure can take place. For example, by operation of one of the pistons 70, one of the control valves 10 can be temporarily taken out of service to ensure that the actuator can be driven via the other control valve. After testing of one control valve in this manner, the other control valve can be taken out of service to permit completion of the testing operation.

As described hereinbefore, it will be appreciated that the control valve of the invention is advantageous in that it permits the required degree of redundancy to be provided in a relatively simple and convenient manner, without requiring the provision of additional components. It is relatively compact and so easy to accommodate and adds minimal additional weight. A number of other benefits will be appreciated by a man skilled in the art.

Whilst the description hereinbefore is of one specific embodiment of the invention, it will be appreciated that numerous modifications and alterations may be made without departing from the scope of the invention.

The invention claimed is:

1. A rotary control valve comprising a first spool, a second spool encircling at least part of the first spool and angularly moveable relative thereto, and a sleeve encircling at least part of the second spool, the second spool being angularly moveable relative to the sleeve, the first and second spools having first and second series of ports registrable with one another, depending upon the relative angular positions of the first and second spools, to control communication between at least a pressure line, a return line and a control line provided in or connected to the sleeve, the second spool and the sleeve having third and fourth series of ports, axially spaced from the first and second series of ports and registrable with one another, depending upon the relative angular positions of the second spool and the sleeve, to control communication between at least the control line and the return line, and latch means operable to resist movement of the second spool relative to the sleeve.

2. A valve according to claim 1, wherein the latch means comprises a formation provided on the second spool, the formation including a recess, a latch element cooperating with the formation and being urged into the recess to resist angular movement of the second spool.

3. A valve according to claim 2, wherein the latch element is spring biased towards the recess.

4. A valve according to claim 2, wherein the recess is of symmetrical, ramped form.

5. A valve according to claim 1, wherein first and second control lines are provided, the establishment of communication between the ports of the first and second series of ports providing communication between one of the control lines and the pressure line and providing communication between the other of the control lines and the return line.

6. A valve according to claim 5, wherein the establishment of communication between the ports of the third and fourth series of ports connects both the first control line and the second control line to the return line.

7. An actuator control arrangement comprising a pair of control valves as claimed in claim 1 and used in combination in controlling the operation of an actuator.

8. An arrangement according to claim 7, wherein the control valves are driven synchronously and, in the event of a jam within one of the valves, the jammed control valve occupies its by-pass position at any time that the still functioning valve establishes communication between the control line(s) and the pressure line and/or return line.

* * * * *